United States Patent [19]
Tomiyama

[11] Patent Number: 5,309,868
[45] Date of Patent: May 10, 1994

[54] CONTAINER FOR LIVE MARINE ANIMALS
[75] Inventor: Yoshimi Tomiyama, Nagasaki, Japan
[73] Assignee: Sanki Kogyo Co., Ltd., Japan
[21] Appl. No.: 970,940
[22] Filed: Nov. 3, 1992
[30] Foreign Application Priority Data
Mar. 24, 1992 [JP] Japan .................. 4-95980
[51] Int. Cl.⁵ ............................. A01K 63/02
[52] U.S. Cl. .................... 119/203; 119/214
[58] Field of Search ............ 119/2, 3, 4, 201, 202, 119/203, 214

[56] References Cited
U.S. PATENT DOCUMENTS

| | | | |
|---|---|---|---|
| 1,995,729 | 3/1935 | Zarotschenzeff | 119/3 |
| 2,890,680 | 6/1959 | Malkin | 119/2 |
| 3,192,899 | 7/1965 | Lucey et al. | 119/4 |
| 3,465,718 | 9/1969 | Mandman et al. | 119/2 |
| 3,727,579 | 4/1973 | Lee | 119/2 |
| 4,089,298 | 5/1978 | Wilson | 119/2 |
| 4,844,012 | 7/1989 | Jerrett | 119/3 |
| 5,117,777 | 6/1992 | Takasugi | 119/3 |

FOREIGN PATENT DOCUMENTS

| | | | |
|---|---|---|---|
| 0072334 | 2/1983 | European Pat. Off. | 119/3 |
| 3805465 | 4/1989 | Fed. Rep. of Germany | 119/4 |
| 2572252 | 5/1986 | France | 119/2 |
| 2643789 | 9/1990 | France | 119/2 |
| 1228421 | 9/1989 | Japan | 119/4 |

Primary Examiner—Gene Mancene
Assistant Examiner—Tedd E. Manahan
Attorney, Agent, or Firm—Bierman and Muserlian

[57] ABSTRACT

A container for live marine animals which have a lower metabolic function comprising a housing formed by outer walls of sheet metal and inner walls of thermal resistant material. Ice boxes formed around the inner walls to cool the interior of the containers at an inner temperature of between about 2° C. and about 10° C. The ice box being provided with a water receiver, and nozzle means connected with the water receiver and a blower for spraying a mixture of water and air in the form of a heavy fog into the interior housing and method of transporting same.

2 Claims, 3 Drawing Sheets

CONTAINER FOR LIVE MARINE ANIMALS

FIELD OF INVENTION

This invention relates to containers of live marine animals, and more particularly to containers for storing and transporting the marine animals in keeping them alive.

STATE OF THE ART

In order to supply fresh marine animals, such as fishes and crustaceans, hereinafter referred to as "fishes", to demanders, it is a very important to keep the fishes alive in storing and transporting.

Usually, in order to store or transport the live fishes, they are contained in a vessel filled with water or seawater. When the live fishes have been contained in the water in the vessel for a long time, the water will be contaminated by their body wastes and oxygen in the water will be decreased. Further, when the vessel is transported by a vehicle, the fishes are violently rocked with the water. Consequently, the life of fish in the water in the vessel is extremely shortened.

Crustaceans, such as prawns, lobsters or crabs, can be kept alive in a box filled with wetted sawdust, but it is very hard to keep them alive over a long time.

OBJECTS OF THE INVENTION

In view of the foregoing, it is a principal object of the present invention to provide a container for keeping fishes alive without using a large quantity of water in storage or transporting.

It is another object of the present invention to provide a method for preserving living fishes by controlling their metabolism.

SUMMARY OF THE INVENTION

In order to achieve these objects, according to the present invention, the live fishes are controlled in their metabolism, and the fishes may be entered into a container the inner temperature of which is maintained at a desired low temperature, and spraying a mixture of water and air in the form of a mist in the container.

According to the present invention, the live fishes are reduced in their basal metabolism and exercise intensity by a cold water which is maintained at about 2° C. to about 20° C., and the fishes are transferred to a vessel without containing water. Then, the vessel is stowed in a container of the present invention. The inner temperature of the container is maintained at a desired low temperature of about 2° C. to about 10° C., and a mixture of air and sea water in the form of mist is sprayed in the container.

BRIEF DESCRIPTION OF THE DRAWINGS

The invention, objects and advantages may be best understood with reference to the following detailed description of illustrative embodiments of the present invention shown in the accompanying drawings, wherein.

DESCRIPTION OF THE PREFERRED EMBODIMENTS

Figure 1:
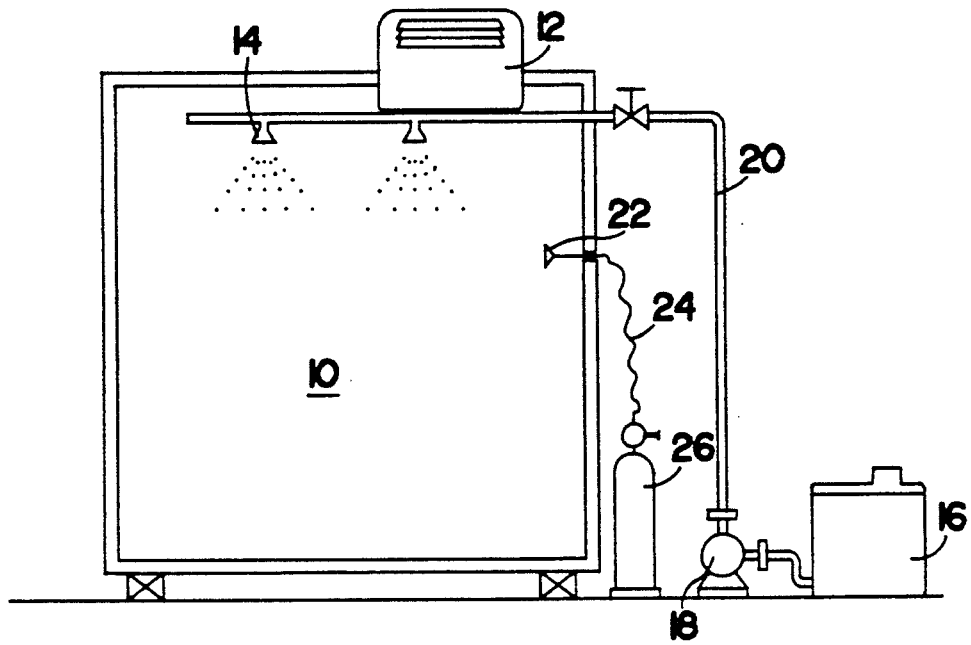
FIG. 1 is a schematic sectional view of the first embodiment of the container according to the present invention.

Referring to FIG. 1, there is shown the first embodiment of a container 10 of the present invention. The container 10 in which the fishes which are suppressed in their basal metabolism may be contained. In the container 10 there is provided with a refrigerator 12 and a nozzle means 14 for spraying water in the form of a mist. The nozzle means 14 is connected through a conduit 20 having a pump 18 with a water tank 16 attached to the outside of the container 10. In the inside of the container 10, there is provided with a further nozzle 22 for discharging oxygen and the nozzle is connected through a conduit 24 with an oxygen supply 26.

The container 10 can be used for storing the fishes in living condition for a long time and also it is preferable to transport by a vehicle.

Figure 2:
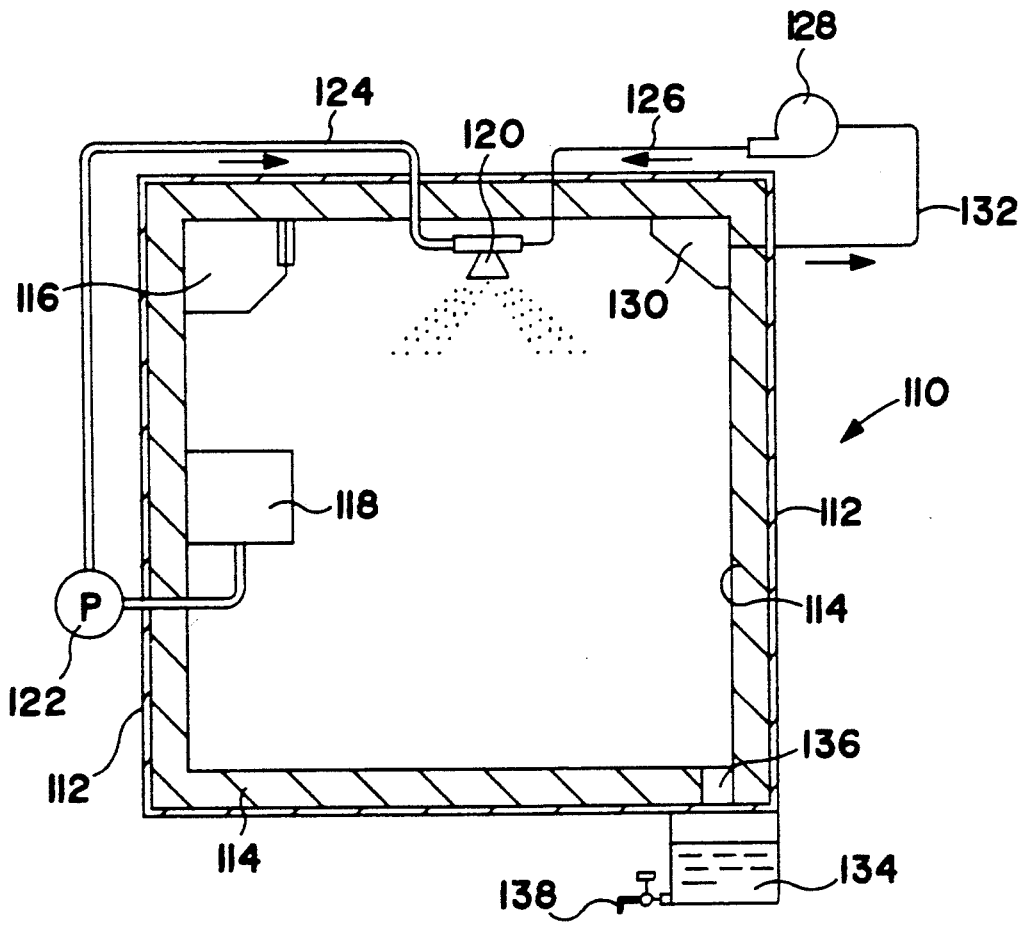
FIG. 2 is a schematic sectional view of the second embodiment of the container according to the present invention.

FIG. 2 shows the second embodiment of the container 110 according to the present invention. A container 110 is constructed by outer walls 112 of metal plate and inner wall 114 which is formed from heat-resistant material such as plastic foams. At an appropriate portion of the housing 110, a door or doors, not shown may be provided.

In an inside of the container 110, their is provided with a refrigerator 116 and a water tank 118 in which fresh water or sea water may be filled in response to the kind of fishes. At a inner top portion of the container 110, there is provided with a nozzle means 120 for spraying a mixture of water and air in the form of a mist into the container 110. The nozzle means 120 is connected through a conduit 124 having an electric pump 122 to the water tank 118. The nozzle means 120 is connected through a second conduit 126 to a blower 128 which is mounted on the outside of the container 110 so as to supply air to the nozzle means 120. It is, however, preferable to prepare an air strainer 130 in the inside of the container 110 and the strainer can be connected through a conduit 132 with an inlet of the blower 128 so as to supply cold air to the nozzle means 120.

At the bottom of the container 110, there is provided with a water basin 134 which is connected through a passage 136 with the inside of the container 110. The basin 134 may be provided with a cock 138 in order to drain water therefrom.

Figure 3:
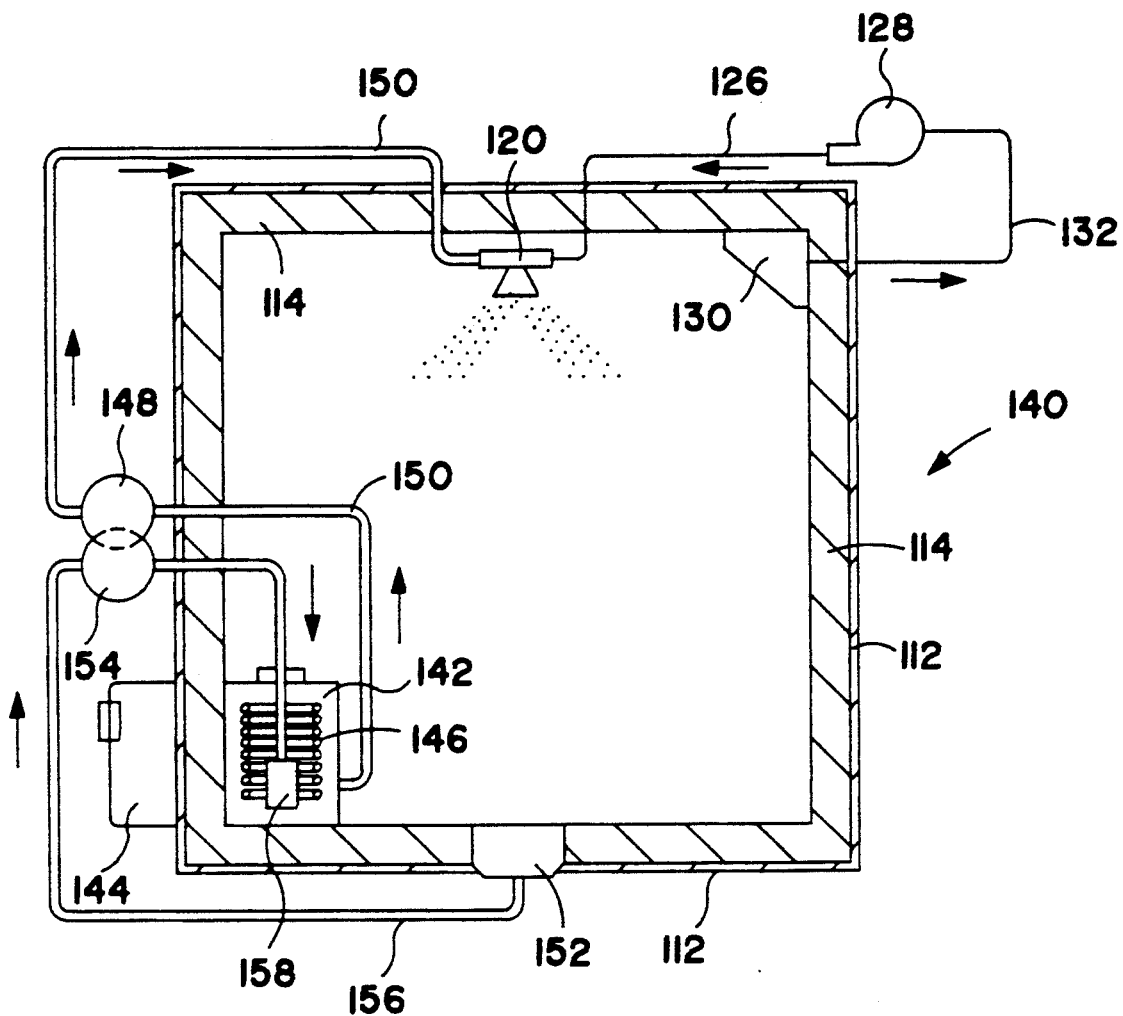
FIG. 3 is a schematic sectional view of the third embodiment of the container according to the present invention.

Referring to FIG. 3, a container 140 is constructed in the same manner as the container 110 of the second embodiment. In the inside of the container 140, there is provided with a water tank 142 filled with water or sea water. The water tank 142 is provided with a heat exchanging coil means 146 to which refrigerant is supplied from a refrigerator 144.

At an inner upper portion of the container 140, there is provided with a nozzle means 120 for spraying a mixture of water and air in the form of a mist as explained with reference to FIG. 2 and water from the tank 142 is supplied to the nozzle means 120 through a conduit 150 having an electric pump 148. In order to supply air to the nozzle means 120, an air strainer 130 which is provided in the inside of the container 140 is connected through a conduit 132 with the upstream side of a blower 128 and the downstream side of the blower 128 is connected through a conduit 126 with the nozzle means 120.

In the bottom of the interior of the container 140, there is provided with a water receiver 152 in order to receive water condensed from the moist in the container 140. The water in the receiver 152 can be supplied to the water tank 142 through a conduit 156 having an electric pump 154. Both pumps 148 and 154 may be combined to form a dual pump. It is preferable to provide a micro-filter means 158 at the end of the conduit 156 in the water tank 142 for the purpose of purifying the water to be supplied to the tank.

Figure 4:
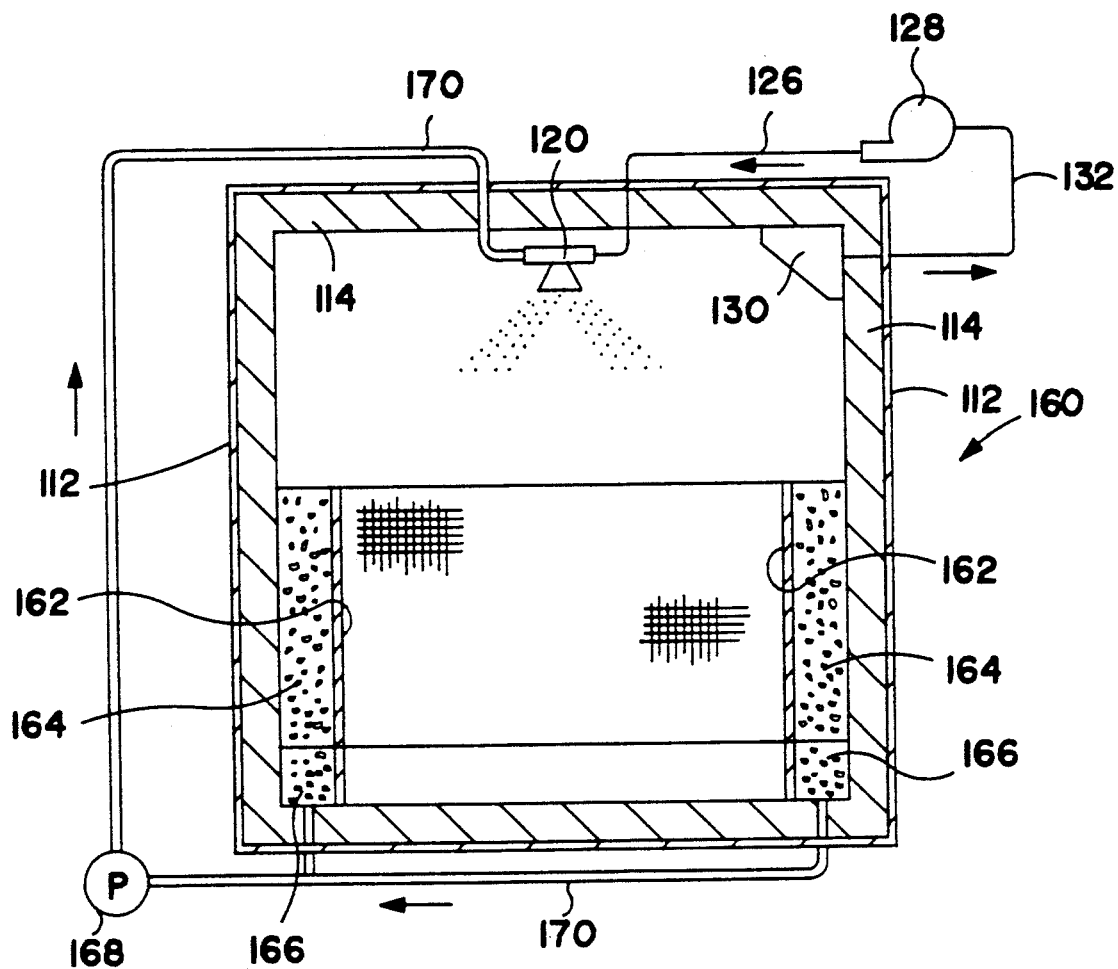
FIG. 4 is a schematic sectional view of the fourth embodiment of the container according to the present invention.

Referring to FIG. 4, a container 160 of the fourth embodiment of the present invention is constructed by outer walls of metal plate and inner walls 114 of heat resistant material as described previously. In this embodiment, a perforated partition wall 162 is provided at a desired distance from each of the inner walls 114 so as to form a ice box 164 between the inner wall and the partition. At the bottom of the ice box, there is provided with a water reservoir 166 to receive water from the ice box 164.

At the inner upper portion of the container 160, there is provided with a nozzle means 120 in the same manner as mentioned foregoing, and water can be supplied to the nozzle means 120 from water receiver 166 through a conduit 170 by means of a pump 168. As stated above, the nozzle means 120 is connected with the air strainer 130, a conduit 132, a blower 128 and a conduit 126.

According to the present invention, the inside of the container 10; 110; 140 or 160 can be controlled and maintained to a desired temperature, such as about 2° C. to about 10° C. When a mixture of water and air is sprayed in the container by the nozzle means, the container can be filled with a dense mist.

In our experiment, 206 live lobsters which are controlled and suppressed in their metabolism as mentioned above are contained in the container, and after 24 hours only 7 lobsters died.

EXPERIMENTAL EXAMPLE 200 live sea breams were entered into a vessel filed with water the temperature of which was maintained at about 22° C., and then the temperature of the water was lowered to about 10° C. in 8 hours. They became slow in action due to a lowering of their metabolism. Such sea breams were transferred into a container of the present invention the inner temperature in which was maintained at about 10° C., and a mixture in the form of a mist of sea water and oxygen of about 3% by volume of the container was sprayed therein at about 5 liter per hour. After 24 hours, the death rate of the sea bream in the container was zero.

What is claimed is:

1. A container for live marine animals which have a lower metabolic function comprising a housing formed by outer walls of sheet metal and inner walls of thermal resistant material, means for cooling the interior of the container including ice boxes formed around the inner walls to maintain an inner temperature of between about 2° and about 10° C., each of said ice boxes being provided with a water receiver, and nozzle means connected with the water receiver and a blower for spraying a mixture of water and air in the form of a heavy fog into the interior housing of the said ice boxes.

2. A method for keeping marine animals alive in a vessel filled with water, the temperature of which is maintained at about 20° C., lowering the temperature of the water to about 10° C. over 8 hours to lower the metabolic function of each of the animals, transporting said marine animals from the vessel to a container maintained at a temperature of about 10° C. and ejecting a mixture of water and air in the form of a heavy fog into the interior of the container.

* * * * *